United States Patent
Cheetham et al.

[11] Patent Number: 6,144,892
[45] Date of Patent: Nov. 7, 2000

[54] GAUGING SYSTEM

[75] Inventors: Charles J. Cheetham, Wayne; Christopher J. Humme, Pequannock, both of N.J.

[73] Assignee: Royal Master Grinders, Inc., Oakland, N.J.

[21] Appl. No.: 09/021,472

[22] Filed: Feb. 10, 1998

Related U.S. Application Data

[60] Continuation-in-part of application No. 08/799,399, Feb. 12, 1997, Pat. No. 5,746,644, which is a division of application No. 08/635,328, Apr. 19, 1996, Pat. No. 5,674,106, which is a continuation-in-part of application No. 08/598,549, Feb. 8, 1996, abandoned.

[51] Int. Cl.[7] ..................................................... G06F 19/00
[52] U.S. Cl. ........................... 700/108; 700/109; 700/114; 700/174; 700/186; 700/187; 451/5; 451/6; 451/11
[58] Field of Search .................................... 700/108, 109, 700/110, 114, 174, 175, 176, 161, 184, 186, 187, 164, 167; 451/5, 6, 11, 25, 242, 9–10, 21, 909

[56] References Cited

U.S. PATENT DOCUMENTS

| | | | |
|---|---|---|---|
| 2,394,381 | 2/1946 | Hoern | 451/909 |
| 2,402,293 | 6/1946 | Nye | 451/909 |
| 2,956,378 | 10/1960 | Arlin | 451/909 |
| 2,979,869 | 4/1961 | Birleson et al. | 451/909 |
| 3,534,507 | 10/1970 | Barhorst | 29/33 |
| 3,859,755 | 1/1975 | Schaller | 51/103 |
| 3,986,774 | 10/1976 | Lowrey, Jr. et al. | 356/1 |
| 4,018,011 | 4/1977 | Whittenberg | 51/236 |
| 4,190,797 | 2/1980 | Lecklider et al. | 324/61 R |
| 4,192,102 | 3/1980 | Jessup | 51/103 |
| 4,275,527 | 6/1981 | Daito et al. | 51/103 |
| 4,293,913 | 10/1981 | Nishimura et al. | 451/8 |
| 4,299,491 | 11/1981 | Waters et al. | 356/376 |
| 4,388,816 | 6/1983 | Ferket et al. | 72/14 |
| 4,396,836 | 8/1983 | Vitaliani et al. | 700/159 |
| 4,558,537 | 12/1985 | MacLeod et al. | 51/66 |
| 4,756,126 | 7/1988 | Pozzetti | 51/289 R |
| 4,777,769 | 10/1988 | Mclaughlin et al. | 51/165.71 |
| 4,818,100 | 4/1989 | Breen | 356/5 |
| 4,926,603 | 5/1990 | Frost et al. | 51/165.77 |
| 4,930,260 | 6/1990 | Itoh et al. | 51/103 |
| 4,967,515 | 11/1990 | Tsujiuchi et al. | 51/165.75 |
| 5,022,194 | 6/1991 | Schumacher | 51/290 |
| 5,060,423 | 10/1991 | Klotz | 51/165.71 |
| 5,123,213 | 6/1992 | Vinson | 51/103 WH |
| 5,177,901 | 1/1993 | Smith | 451/72 |
| 5,480,342 | 1/1996 | Bannayan et al. | 451/5 |
| 5,533,931 | 7/1996 | Imai et al. | 451/5 |
| 5,567,195 | 10/1996 | Tufts et al. | 451/182 |
| 5,748,505 | 5/1998 | Greer | 700/108 |
| 5,988,645 | 11/1999 | Downing | 273/348 |

*Primary Examiner*—Paul P. Gordon
*Assistant Examiner*—Ramesh Patel
*Attorney, Agent, or Firm*—Lerner, David, Littenberg, Krumholz & Mentlik, LLP

[57] ABSTRACT

A gauging system is disclosed. The gauging system is adapted to determine the dimensions of an elongate workpiece. A movement assembly is provided for effecting relative longitudinal movement between the gauging device and the elongate workpiece so that the gauging device can repeatedly detect the diameter of the workpiece relative to reference positions along the length of the workpiece. This enables the profile of the workpiece to be accurately determined. The gauging device may comprise a laser gauge, or other non-contact gauge. Alternatively, the gauging device may comprise a contact gauge.

31 Claims, 14 Drawing Sheets

| Profile: 7 TAP SI NEW | | Lot: DEFAULT LOT | | Sample: 3 | Operator: DEFAULT OPERATOR | |
|---|---|---|---|---|---|---|

Summary Of Calculated Intersection Data

| Taper Number | 1 | 2 | 3 | 4 | 5 | 6 | 7 |
|---|---|---|---|---|---|---|---|
| Start Diameter | 0.17292 | 0.19863 | 0.22326 | 0.24785 | 0.27484 | 0.29938 | 0.32631 |
| End Diameter | 0.19863 | 0.22326 | 0.24785 | 0.27484 | 0.29938 | 0.32631 | 0.35644 |
| Start Length | 2.621 | 7.794 | 12.726 | 17.918 | 22.878 | 28.078 | 33.008 |
| End Length | 5.127 | 10.277 | 15.329 | 20.440 | 25.403 | 30.441 | 35.395 |

LENGTH UNITS: CENTIMETERS
DIAMETER UNITS: MILLIMETERS

GAUGING SYSTEM

CROSS-REFERENCE TO RELATED APPLICATIONS

This application is a continuation-in-part of patent application Ser. No. 08/799,399, now U.S. Patent No. 5,746,644, filed on Feb. 12, 1997 which is a division of patent application Ser. No. 08/635,328 now U.S. Pat. No. 5,674,106, filed on Apr. 19,1996 which is a continuation-in-part of patent application Ser. No. 08/598,549 filed on Feb. 8,1996 now abandoned.

FIELD OF THE INVENTION

The present invention pertains to a gauging device. More particularly, the present invention pertains to a gauging device which may be used to detect the diametrical dimensions of elongate workpieces relative to detected positions along the length thereof.

BACKGROUND OF THE INVENTION

Gauging devices for determining dimensions at known locations on a workpiece are commonly used to verify compliance with manufacturing specifications. Such gauging devices may be contact devices such as mechanical micrometers and electronic LVDT devices. Non-contact gauging devices also exist in the prior art such as laser gauges.

Notwithstanding the various uses of prior art gauges, a need has heretofore existed for a system which can be used to accurately determine the profile of elongate workpieces machined on centerless grinder assemblies, as well as other elongate workpieces. One such system is disclosed in related U.S. Pat. No. 5,674,106, which is assigned to the common assignee of the present invention, Royal Master Grinders, Inc. of Oakland, N.J.

A prior art system which utilizes a gauge to take post-manufacturing measurements is disclosed in U.S. Pat. No. 4,756,126 which issued to Pozzetti. The gauging system disclosed in the –126 patent has various shortcomings. For example, it would require two or more gauge heads to determine the diameter at different sections of an elongate workpiece. In this regard, the workpiece machined by the grinder disclosed in the –126 patent is longitudinally fixed during grinding operations. The gauging device 12 disclosed therein is mounted on a slide 11 which moves the gauging device toward or away from the fixed workpiece perpendicularly to the longitudinal axis of the workpiece. There is no disclosure, teaching or suggestion whatsoever to use the gauging device disclosed in the –126 patent by continuously detecting dimensions of an elongate workpiece and effecting relative longitudinal movement between the workpiece and the gauging device.

The gauging system of the present invention is particularly efficient for determining the profile of elongate workpieces machined on centerless grinder assemblies. However, it may be also be used to determine the profile of workpieces machined or manufactured on various other apparatus.

A centerless grinder is a manufacturing machine tool which can be used to grind elongate cylindrical workpieces such as wires, rods, pins, golf club shafts and the like. Workpieces machined on centerless grinder may have a constant cross-sectional diameter or may have various tapered sections including slight tapered sections and abrupt diametrical changes. The process of using a centerless grinder to machine such workpieces is also known as grinding the workpieces or removing stock from the workpiece to obtain the desired configuration. Centerless grinders are particularly useful where precision tolerances are required and where particularly accurate profiles are desirable.

Centerless grinders include three main components. A work wheel, which is also known in the art as a grinding wheel, a regulating wheel and a work rest blade. The work wheel is the machine component that usually performs the actual removal of stock from the workpiece. The work wheel thus determines the surface finish and the overall configuration of the workpiece. The surface texture of the work wheel can be varied depending upon the particular grinding operation desired.

The regulating wheel is the machine component which directs and guides the workpiece to the work wheel. The regulating wheel is also responsible for driving the workpiece and causing rotation thereof during the grinding process.

The work rest blade is the machine component which provides support for the workpiece during machining (i.e., grinding) operations. The regulating wheel will cause the workpiece to rotate on the work rest blade while the work wheel remove an amount of stock required to obtain the desired diameter or taper of the associated workpiece. Prior art work rest blades include horizontal or angled support surfaces. The particular orientation of the work rest blade surface may be selected in accordance with the required configuration of the completed workpiece.

Royal Master Grinders, Inc. of Oakland, N.J. developed and manufacture a centerless grinder assembly which has photoelectric sensors detecting the position of the trailing end of the workpiece during machining operations. The detected signal is processed and causes the regulating wheel to change its position with respect to the work wheel so that the configuration of the workpiece is modified. As the trailing end of the workpiece is detected by additional sensors, further signals are generated and processed which may cause the regulating wheel to again change its position with respect to the work wheel. Accordingly, the machined workpiece may include one or more tapered sections. The tapered sections may be gradual, or abrupt, depending upon the desired configuration of the workpiece. Royal Master's aforementioned prior art centerless grinder is widely used in commercial practice and is further described in its –106 patent.

The gauging system of the present invention may be used in conjunction with centerless grinder assemblies. It overcomes the shortcomings of the prior art by providing a system where the profile of a machined workpiece can be accurately determined by effecting relative longitudinal movement between a gauging device and the elongate machined workpiece.

Although the present invention is particularly effective when used in conjunction with centerless grinder assemblies, it may also be used to determine the dimensions or profile of various types of elongate workpieces such as wires, rods, pins, shafts, etc. as well as optical fibers and the like.

SUMMARY AND OBJECTS OF THE INVENTION

The gauging system of the present invention comprises a gauging device adapted to determine the diametrical dimensions of an elongate workpiece and a movement assembly for effecting relative longitudinal movement between the gauging device and the elongate workpiece such that the gauging device repeatedly detects the diameter of the elongate workpiece relative to reference positions along the length of the workpiece. In a preferred embodiment, the gauging device may comprise a non-contact device such as a laser gauge or the like. Alternatively, the gauging device may comprise a contact device such as mechanical micrometers, LVDT gauges, etc.

Preferably, the gauging system includes a track on which the movement assembly is slidably mounted. The movement assembly may comprise a carriage mounted for controlled slidable movement along the track, and a motor assembly for effecting the controlled slidable movement of the carriage. The structure and operation of the components of the movement assembly may vary in alternate embodiments of the present invention. In this regard, other movement means may be provided in lieu of, or in addition to, the components of the movement assembly discussed above.

The gauging system of the present invention may also comprise a clamping mechanism for clamping the elongate workpiece in a fixed position with respect to the carriage. Further, position determination means may be provided as part of the gauging system for repeatedly detecting the relative position of the elongate workpiece with respect to detected diametrical dimensions of the workpiece over substantially the entire length thereof. In a preferred embodiment, the position determination means works in conjunction with a computer which coordinates substantially simultaneous detection of the workpiece diameter and position by the gauging device and the position determination means. The computer may register a zero reference location of the workpiece and compile workpiece profile data based on the substantially simultaneous detection of the workpiece diameter and position with respect to the zero reference location.

In this preferred embodiment, the position determination means may comprise an encoded information strip arranged substantially parallel to the track. The position determination means may also comprise a sensor head arranged on and in association with the slidable carriage where the sensor head is adapted to read position data stored on the encoded information strip as the carriage slides along the track so that substantially continuous calculations of the relative workpiece position can be performed.

In another preferred embodiment, the encoded information strip may comprise magnetically encoded position information, and the sensor head is adapted to read the magnetically encoded information. In alternate embodiments, various types of encoded information may be arranged on the information strip to be read by a corresponding sensor head. For example, optical information may be encoded on the sensor strip and an optical reading sensor head may also be used to read the optically encoded information.

Elongate workpieces used with the gauging system of the present invention may have a profile including a non-uniform diameter along the length thereof. Such a workpiece may have been machined on a centerless grinder assembly or may have been manufactured by other apparatus. Elongate workpieces having a constant diameter profile may also be used in conjunction with the present gauging system.

In yet another preferred embodiment, the gauging system may include a computer system arranged to receive the detected dimensional and relative position data of the workpiece, and to graphically display such data as a workpiece profile. The computer system may comprise a monitor where the detected dimensional and relative position data of a gauged workpiece is displayed on the monitor. The monitor may also graphically display ideal profile data so that the detected workpiece data and the ideal profile data are superimposed on the monitor.

In yet another preferred embodiment, the detected profile data may be displayed on the monitor in a first color and the ideal profile data may be displayed on the monitor in a second color so that the detected profile data and the ideal profile data can be easily visually distinguished.

The computer system may also comprise a printer for providing a print-out of the detected diameter and relative position data. The printer may also graphically display ideal profile data so that the detected workpiece data and the ideal profile data are superimposed on a print-out generated by the printer. The detected profile data may be displayed in a first color and the ideal profile data may be displayed in a second color so that the superimposed detected and ideal profiles can be easily visually distinguished on the printout.

Preferably, the gauging system of the present invention is used in conjunction with a workpiece which has been machined on a centerless grinder assembly. However, it should be appreciated that the gauging system of the present invention may also be used to detect the dimensions and profile of workpieces machined or manufactured by apparatus other than centerless grinder assemblies.

It is an object of the present invention to provide a gauging system where the profile of the elongate workpiece can be detected by effecting relative movement between a gauging device and a workpiece. It is another object of the present invention to provide a system where the configuration and dimensions of a machined workpiece can be visually appreciated by an operator of the system after the workpiece profile is detected as it is gauged by a gauging device.

It is yet another object of the present invention to provide a user friendly gauging system where the operator can readily determine where a machined workpiece is within specified tolerances.

These and other objects, features and advantages of the present invention will be more readily understood when read in conjunction with the following detailed description of the preferred embodiments and the accompanying drawings.

BRIEF DESCRIPTION OF THE DRAWINGS

FIG. 9 is a taper specifications screen shown in a WINDOWS format of the present system.

FIG. 10 is a wire specifications screen shown in a WINDOWS format of the present system.

FIG. 14 is a summary of a numerical print-out of a workpiece having seven tapers.

DETAILED DESCRIPTION OF THE PREFERRED EMBODIMENTS

Figure 3:
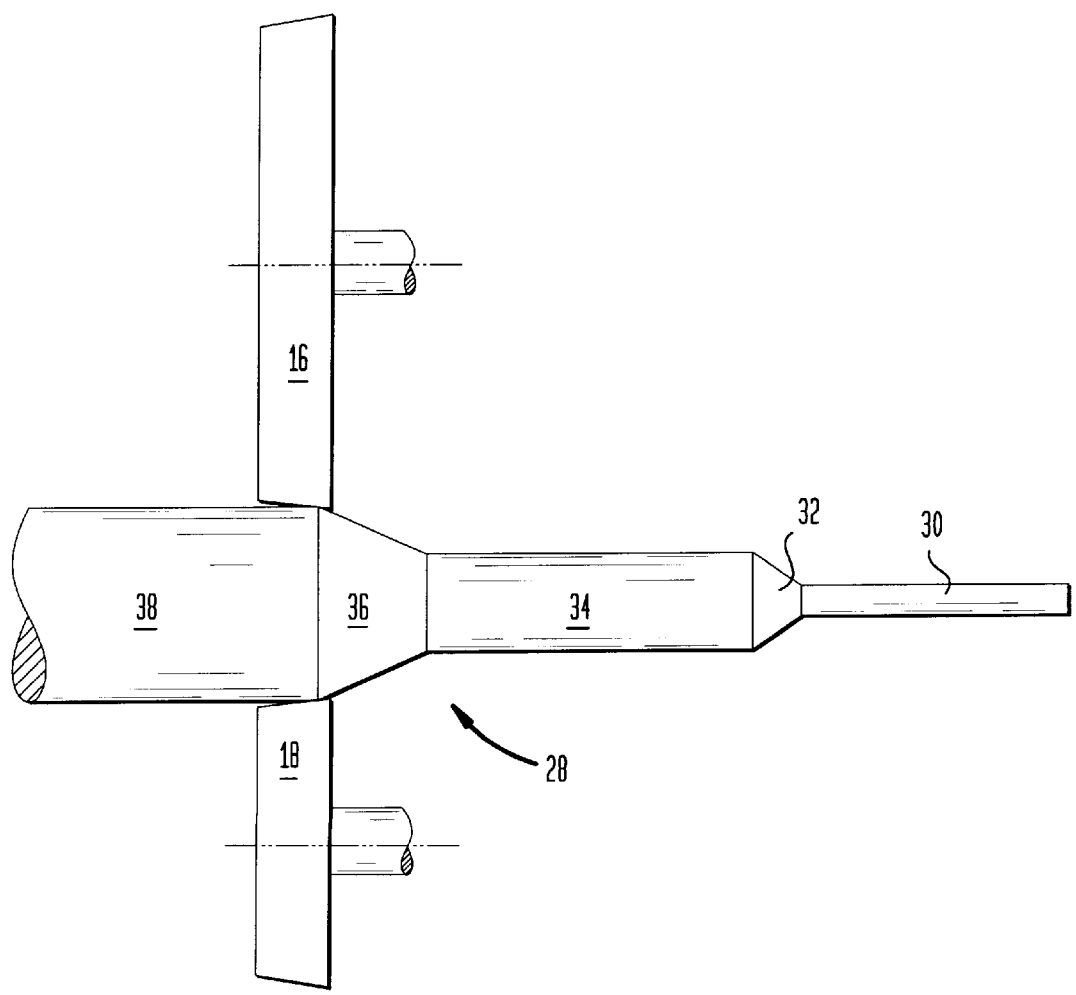
FIG. 3 is a top plan view of the grinding components shown in FIG. 2.

The present gauging system 40 will be described herein for use in determining the dimensions and profile of an elongate workpiece, such as non-uniform workpiece 28. However, it should be appreciated that the gauging system 40 can be effectively used with uniform workpieces (i.e., workpieces having a constant diameter along the entire length thereof) as well as non-uniform workpieces. As used herein, the term "non-uniform" refers to the profile of a workpiece which does not consist only of a constant diameter along the length thereof. As shown in FIG. 3, workpiece 28 is an example of a non-uniform workpiece which includes both constant diameter sections and tapered sections.

Gauging system 40 can be used to determine the profile or diameter at various locations on elongate objects such as wires, pins, rods, shafts, etc. regardless of the type of machines used to manufacture the elongate object. A preferred use of the gauging system 40 relates to gauging of elongate workpieces manufactured on centerless grinder assemblies. Thus, a discussion of how the gauging system 40 can effectively gauge an elongate workpiece 28 manufactured on a centerless grinder assembly is set forth below. However, it should be appreciated that the gauging system 40 can be used to determine the dimensions and profile of substantially any elongate cylindrical object such as optical fibers, etc.

Figure 1:
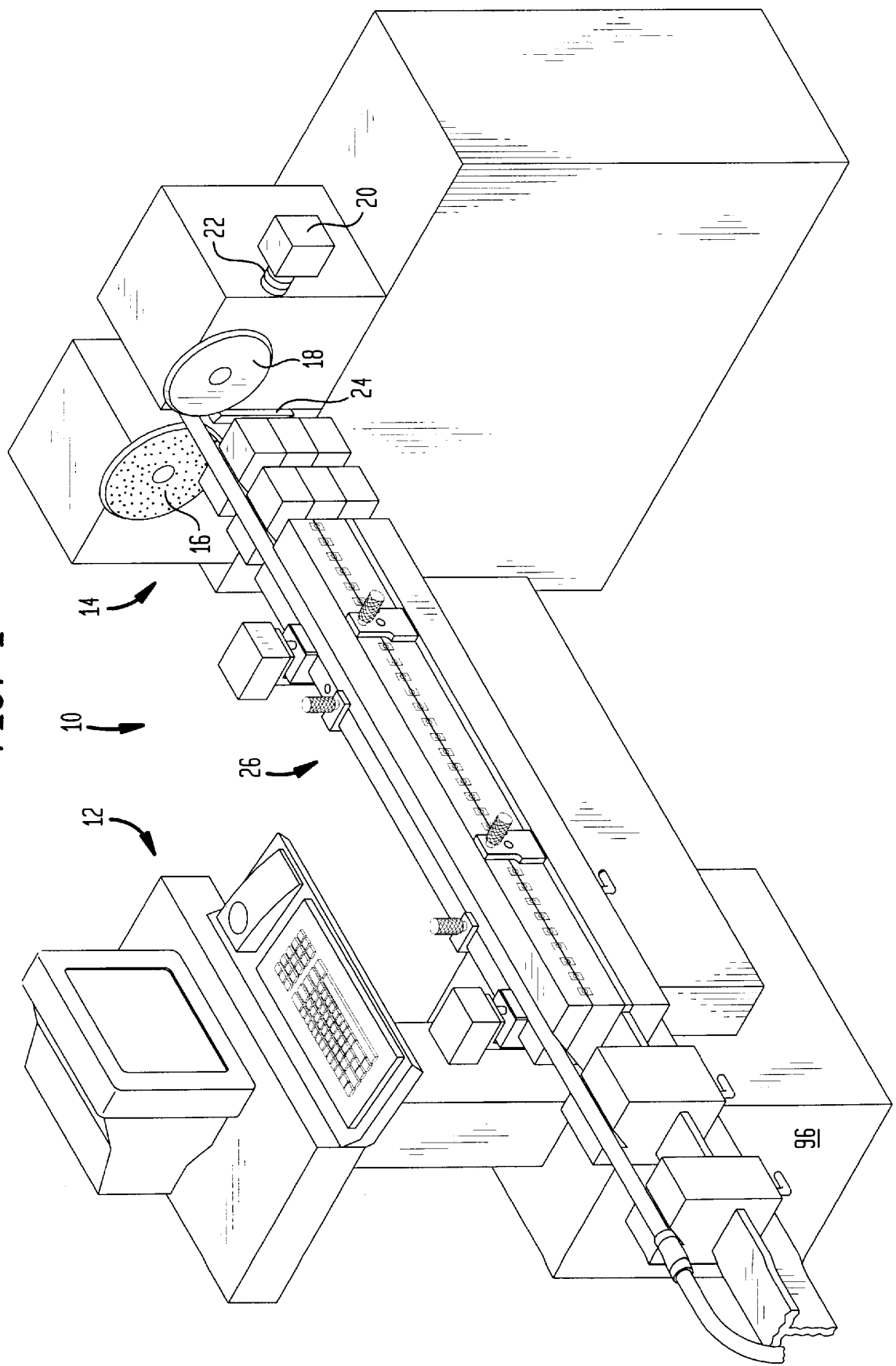
FIG. 1 is a perspective view of a centerless grinder assembly.

A centerless grinder assembly 10 which is described in related U.S. Pat. No. 5,674,106, the subject matter of which is incorporated by reference herein, is illustrated in FIG. 1. The centerless grinder assembly 10 generally includes a computer system 12 for controlling the operation thereof, a grinding assembly 14 and a slidable sensor bank assembly 26. The computer system 12 should not be confused with the computer 66, control box 74 and related system components associated with the gauging system 40 of the present invention. As described in the related –106 patent, the computer system 12 may be a general purpose computer such as a personal computer having a state of the art microprocessor and sufficient memory to permit operation of associated software programs.

The centerless grinder assembly 10 is preferably used to grind elongate workpieces. By way of example, in describing the structure and operation of the centerless grinder assembly 10, a wire workpiece 28 is discussed herein as a preferred elongate workpiece.

Figure 2:
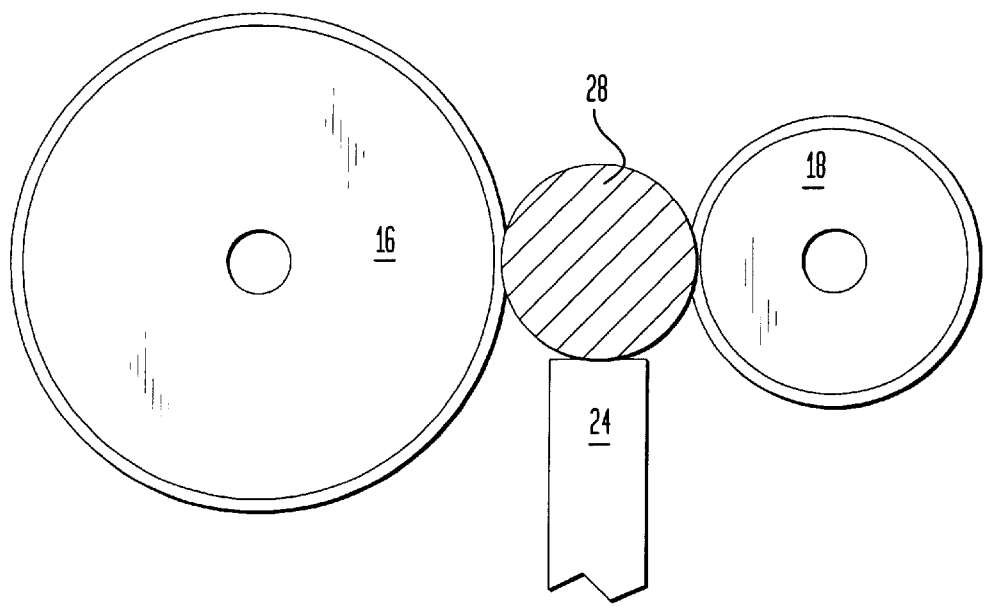
FIG. 2 is a schematic side view of selected components of the grinding assembly of the centerless grinder assembly shown in FIG. 1.

As shown in FIGS. 1 and 2, the grinding assembly 14 includes a work wheel 16 and a regulating wheel 18. The work wheel 16 is known in the art, and, in a preferred embodiment, may comprise a twelve inch diameter. The regulating wheel 18 is also known in the art. In a preferred embodiment, it may have a diameter of about six inches. However, it should be understood that the above dimensions of the work wheel 16 and the regulating wheel are by way of example only, as the dimensions thereof can vary greatly in alternate embodiments. A lead screw 22 and a precision stepping motor 20 may be used to selectively drive the regulating wheel 18 toward or away from the work wheel 16.

A work rest blade 24 is arranged between the work wheel 16 and the regulating wheel 18 for supporting a workpiece 28 during machining operations. The support surface of the work rest blade 24 may be horizontally oriented, or may be oriented at an angle with respect to a horizontal plane. The angle of the work rest blade support surface will affect the overall orientation of the machined workpiece 28.

The slidable sensor bank assembly 26 is described in detail in the related –106 patent. The various components of the slidable sensor bank assembly 28 will not be discussed herein and thus, have not been afforded reference numerals.

FIG. 2 illustrates the non-uniform workpiece 28 as it is supported on the work rest blade 24 which includes a top support surface (unnumbered). The work rest blade 24 supports the work piece 28 during the entire grinding process and permits the workpiece 28 to freely rotate on its top support surface during such grinding process.

As illustrated in FIG. 3, the work wheel 16 and the regulating wheel 18 have angled surfaces which enable the workpiece 28 to be precisely machined in accordance with a desired configuration. The regulating wheel 18 is preferably arranged at a slightly offset angle with respect to a vertical plane (not shown). The offset relationship of the regulating wheel 18 with respect to the vertical plane is known in the art and permits the regulating wheel 18 to draw the workpiece 28 past the work wheel 16 while continuously spinning the workpiece 28. As is known in the art, the vertical component of the regulating wheel orientation is primarily responsible for causing the workpiece 28 to spin while the horizontal component of the regulating wheel orientation is primarily responsible for drawing the workpiece 28 past the work wheel 16.

FIGS. 4–7 illustrate various views of the gauging system 40 of the present invention. As particularly shown in FIG. 4, the gauging system 40 may include a support stand 42, such as a table assembly or the like. A laser gauging device 44 is used to detect the workpiece diameter at various locations along the length of a machined workpiece 28. The laser gauging device 44 may be similar to known laser gauges with respect to the laser detecting mechanism. It should be appreciated that various other types of gauging devices may be used in connection with the present invention. Preferably, the gauging device is a non-contact gauge where the device can detect the diametrical dimensions of a workpiece without physically contacting the workpiece. However, contact gauging devices, such as LVDT type devices and mechanical micrometers may also be used in accordance with the present invention.

It is preferable for the gauging device 44 to be a non-contact type in order to minimize risk of damage to relatively fragile workpieces during gauging procedures. To this end, it is not uncommon for workpieces, such as workpiece 28, to have sections with diameters of less than about 0.1 mm. Of course, the dimensions of the various sections of a non-uniform workpiece, such as workpiece 28 may vary greatly as the present invention is not limited in any way to the size of the workpiece.

Figure 6:
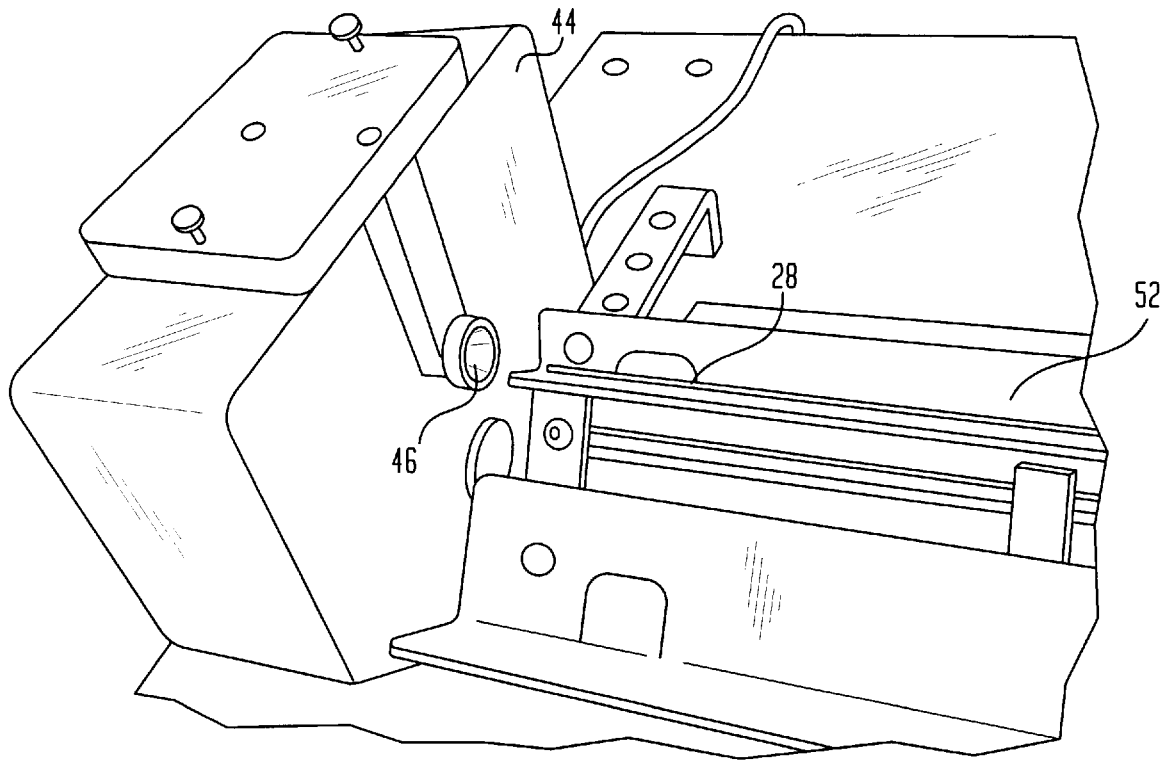
FIG. 6 is a top perspective view of a portion of the gauging system shown in FIG. 4.
Figure 7:
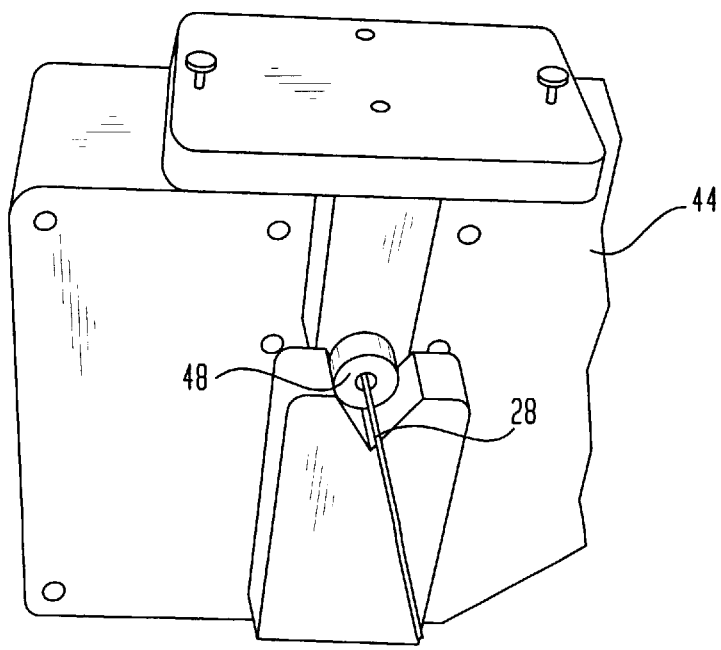
FIG. 7 is a front perspective view of a portion of the gauging system shown in FIG. 4.

As best shown in FIGS. 6 and 7, the gauging device 44 includes a funnel-shaped entrance guide 46 and an exit guide 48 having a relatively small circular passageway through which workpiece 28 may extend during gauging operations.

The workpiece 28 may be supported in a wire guide track 52, which appears in FIG. 6 as a substantially v-shaped trough. The wire guide track 52 simply supports the wire 28 as it is pulled through the gauging device 44 during gauging operations.

Figure 4:
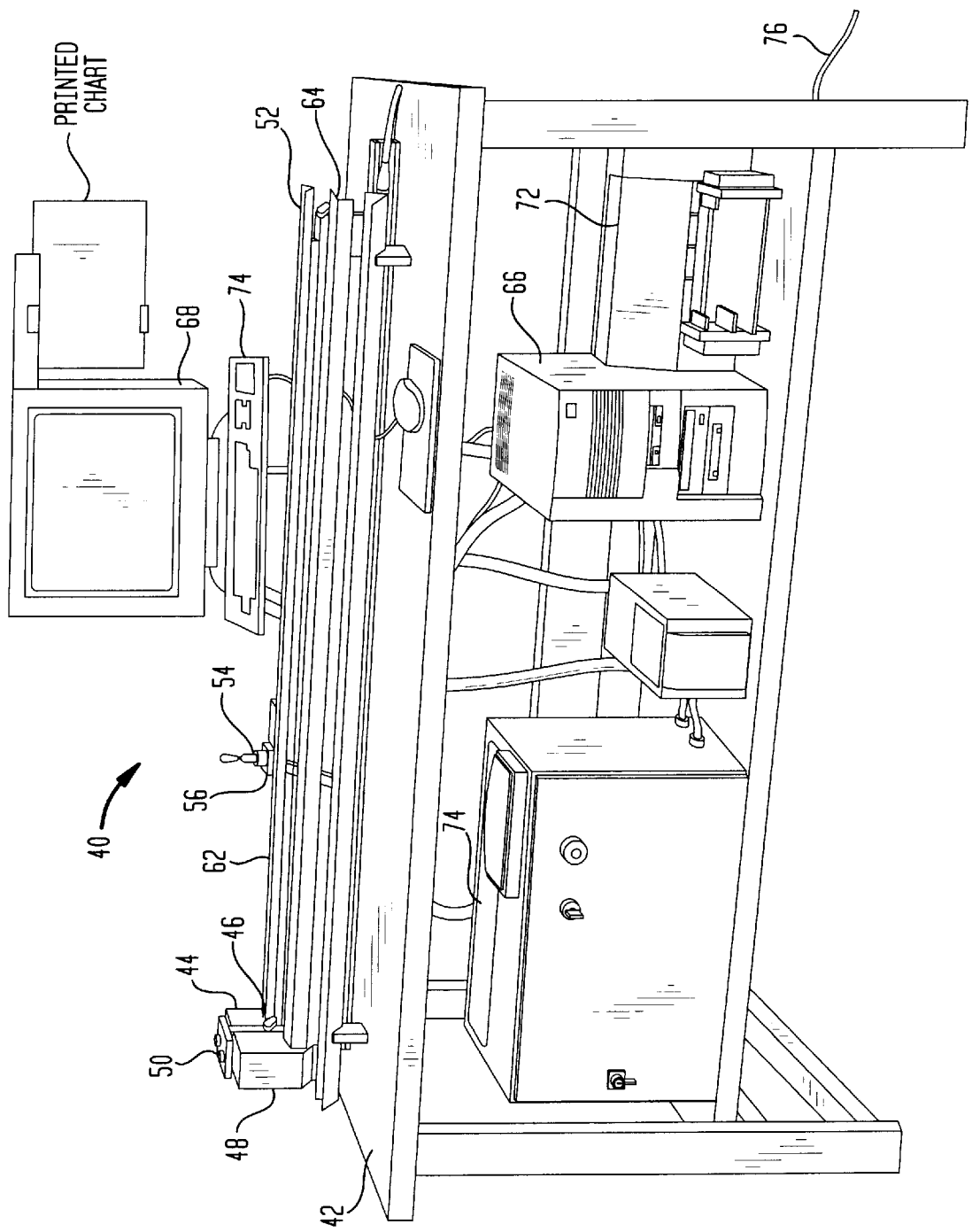
FIG. 4 is a front view of the gauging system of the present invention.
Figure 5:
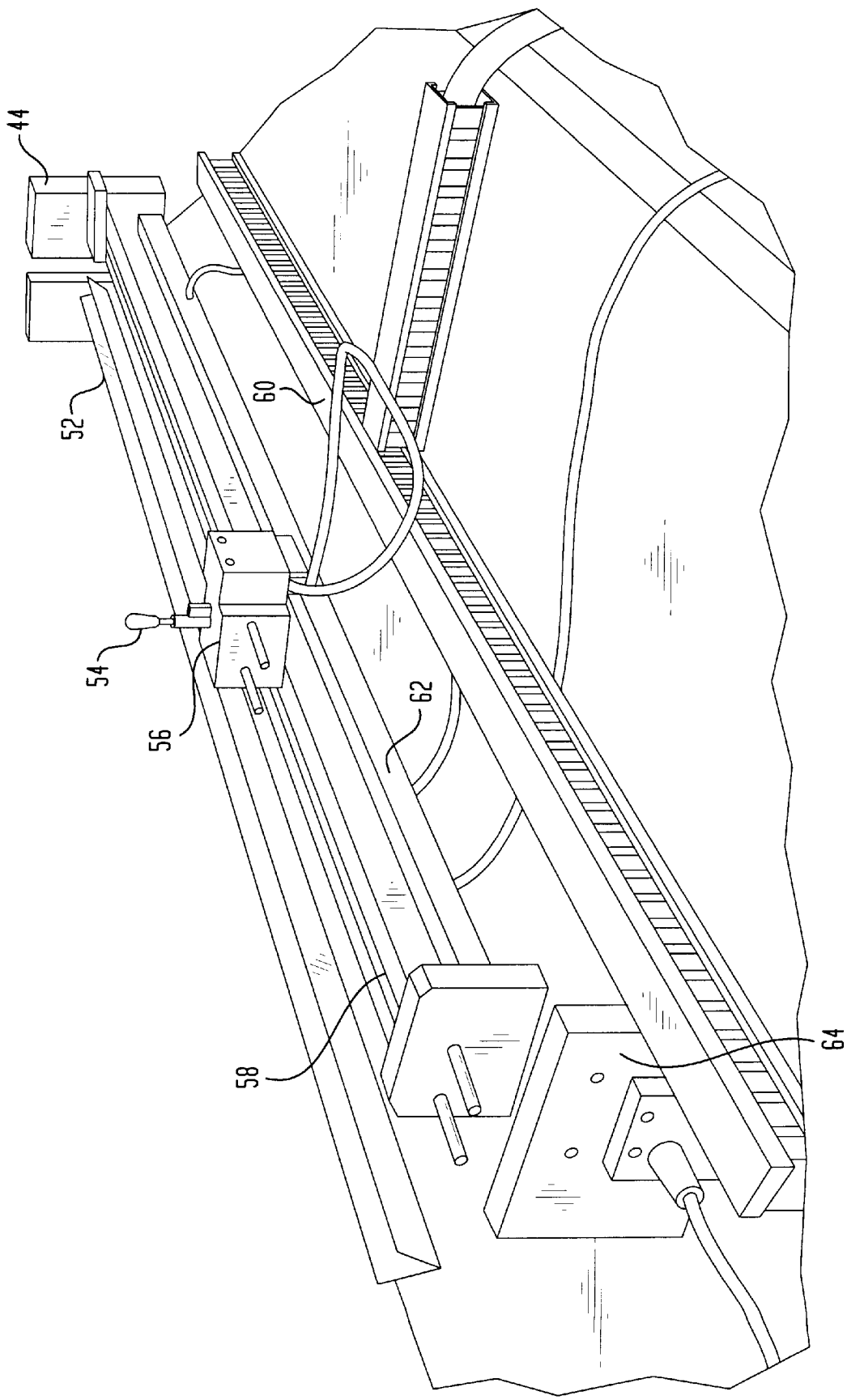
FIG. 5 is a rear perspective view of the present gauging system.
Figure 8:
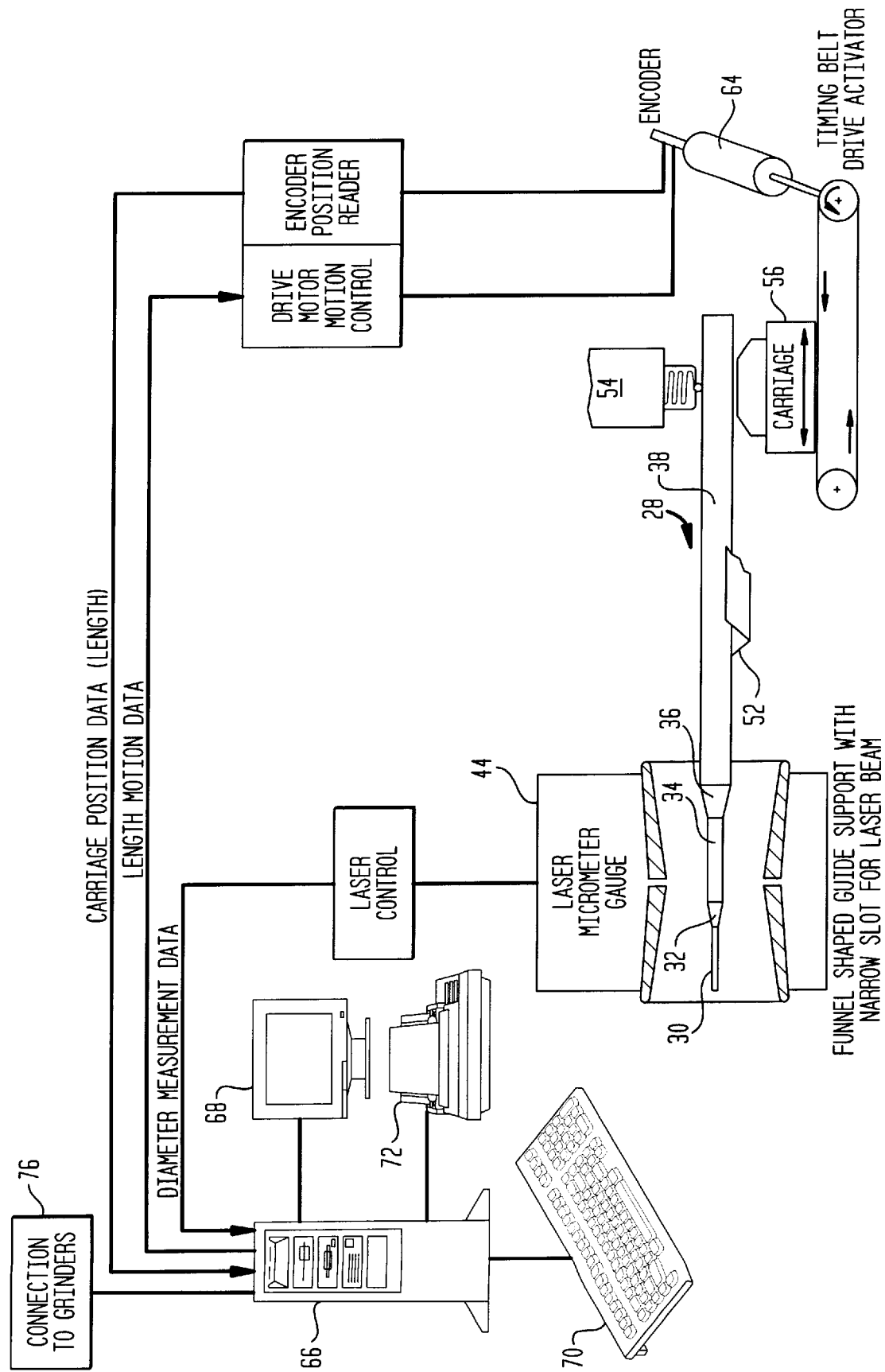
FIG. 8 is a combination schematic view and block diagram of the present gauging system.

A wire clamp 54 which is intended to gently, but securely, retain the workpiece 28 in a fixed position with respect to a slidable carriage 56 during gauging operations is illustrated in FIGS. 4, 5 and 8. The carriage 56 is also illustrated in FIGS. 4, 5 and 8 and is mounted for controlled slidable movement on carriage track 58. The carriage 56 also supports a sensor head 60, which may comprise a magnetic sensor for reading encoded magnetic information retained on the encoded strip 62.

As shown in FIG. 5, the encoded strip 62 is arranged to extend longitudinally parallel to the carriage track 58 and is mounted just below the carriage track. As discussed further below, the sensor head 60 should be positioned in close enough proximity to the encoded strip 62 so that accurate position information readings can be determined as the sensor head 60 slides along the encoded strip 62. The combination of the sensor head 60 and the encoded strip 62 may be considered position determination means for repeatedly detecting the relative position of the workpiece 28 with respect to the detected diametrical dimensions of the workpiece 28 obtained by the gauging device 44. This aspect of the present invention will also be discussed in more detail below.

FIGS. 4, 5 and 8 also illustrate a linear stepper motor 64 which effects controlled slidable movement of the carriage 56 and the sensor head 60 along the carriage track 58. In a preferred embodiment, the workpiece 28 is secured to the carriage assembly 56 for slidable movement through the gauging device 44 where repeated diametrical readings are taken as the workpiece 28 is drawn through the gauging device 44. However, it should be appreciated that in alternate embodiments, the workpiece 28 may be secured in a fixed position and the gauging device 44 may be moved longitudinally along the workpiece 28. In either embodiment, the important concept is that there is relative longitudinal movement between the workpiece 28 and the gauging device 44. Since the gauging device 44 is preferably a non-contact device, such as a laser gauge, the workpiece 28 will not be damaged in any way during gauging operations.

A computer 66 and a computerized control box 74 are illustrated in FIGS. 4 and 8. These components of the gauging system 40 coordinate the substantially simultaneous detection of the diametrical readings of the workpiece 28 and the position thereof obtained by the gauging device 44 and the position determination means (i.e., the sensor head 60 and the corresponding encoded strip 62). As shown in FIG. 4, the computer 66 may be a PC having a Pentium processor, or other state of the art processor capable of handling the required associated software and data calculations.

Figure 15:
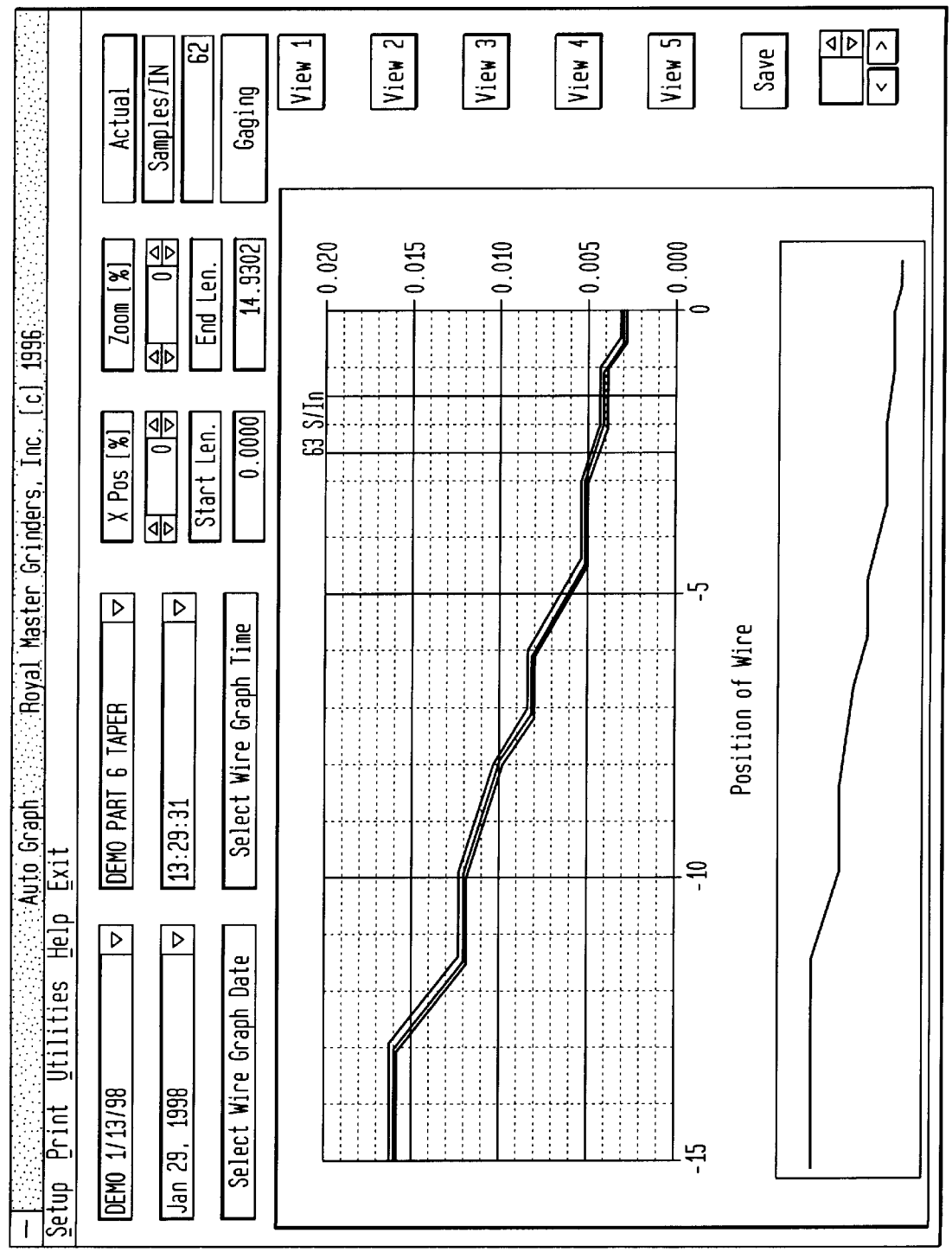
FIG. 15 is an auto graph screen shown in a WINDOWS format of the present system providing a graphical depiction of the ideal profile and an actual machined workpiece profile.
Figure 16:
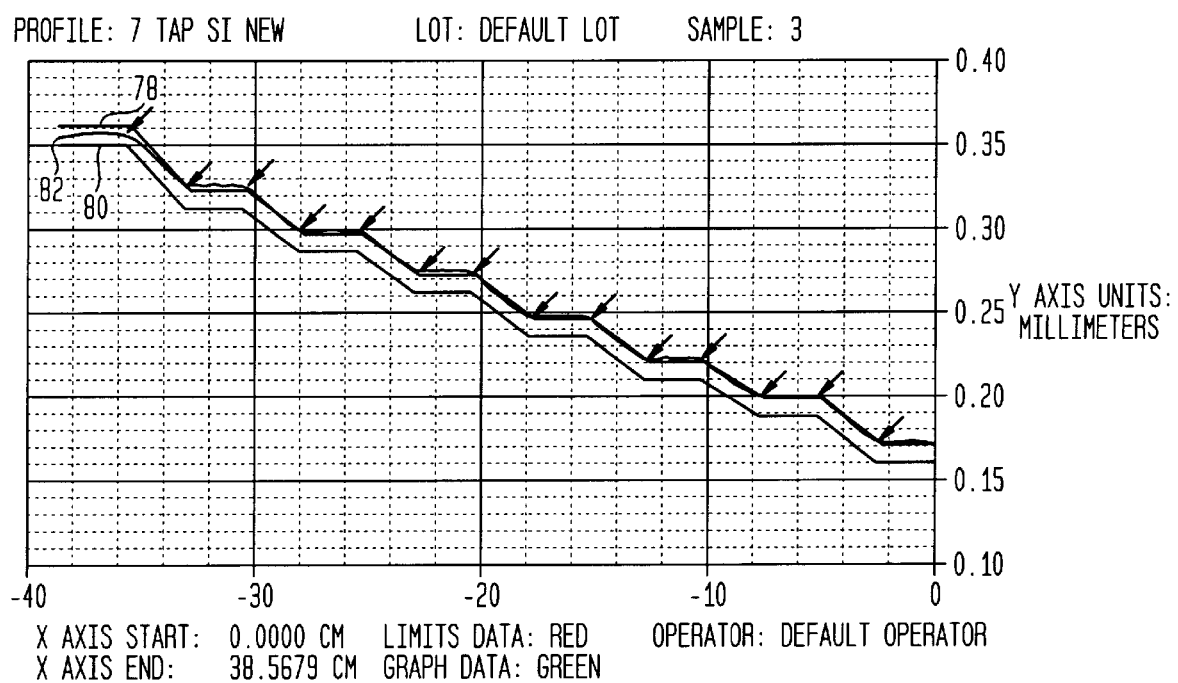
FIG. 16 is a print-out of a superimposed graph of the ideal workpiece profile and an actual machined workpiece profile.

A monitor 68 is also shown in FIGS. 4 and 8 for providing a user friendly interface to the system operator. An advantageous feature of the present invention is that the monitor 68 may be used to graphically depict the profile of a machined workpiece, such as workpiece 28. The monitor 68 may also be used to graphically depict the profile of an ideal workpiece configuration including a preset tolerance range. In a preferred embodiment, the monitor 68 may be used to superimpose the graphical display of a machined workpiece profile and an ideal workpiece profile so that a clear visual indication can be provided demonstrating whether the machined workpiece profile is within certain pre-selected tolerances. This aspect of the present invention is illustrated in FIGS. 4, 15 and 16, and will be discussed further below.

The gauging system 40 also includes a keyboard 70 and a mouse (unnumbered) which enables a system operator to input required information into the computer 66. Other state of the art input devices may also be used. A printer 72 is also shown in FIGS. 4 and 8 for providing a graphical print-out of the profile of the machined workpiece 28 after gauging operations. The printer 72 may also provide a graphical print-out of the configuration of an ideal workpiece in the same manner that the configuration of the ideal and machined workpieces can be displayed on the computer monitor 68.

The computerized control box 74 includes the on/off power circuit and various hardware control circuits for controlling operation of the gauging system 40.

A communication cable 76 is shown in FIG. 4, and is schematically illustrated in FIG. 8, for connecting the gauging system 40 to a centerless grinder assembly, such as centerless grinder assembly 10 shown in FIG. 1. The communication cable 76 is intended to permit feedback signals of the offset (i.e., the difference between the dimensions of a machined workpiece and the dimensions of an ideal workpiece) to the computer system 12 of the centerless grinder assembly 10 so that the next workpiece will be more accurately machined as discussed in copending patent application Ser. No. 08/799,399, the content of which is incorporated by reference herein. This related application also claims priority on the application which matured into applicant's related –106 patent.

The user-friendly operator interface of the gauging system which is displayed on monitor 68 in a universal WINDOWS format makes it particularly simple to operate the gauging system 40. All of the necessary information to gauge and evaluate the profile of the machined workpiece 28 may be performed by simply clicking the mouse (unnumbered) at the proper user friendly prompts.

Figure 9:
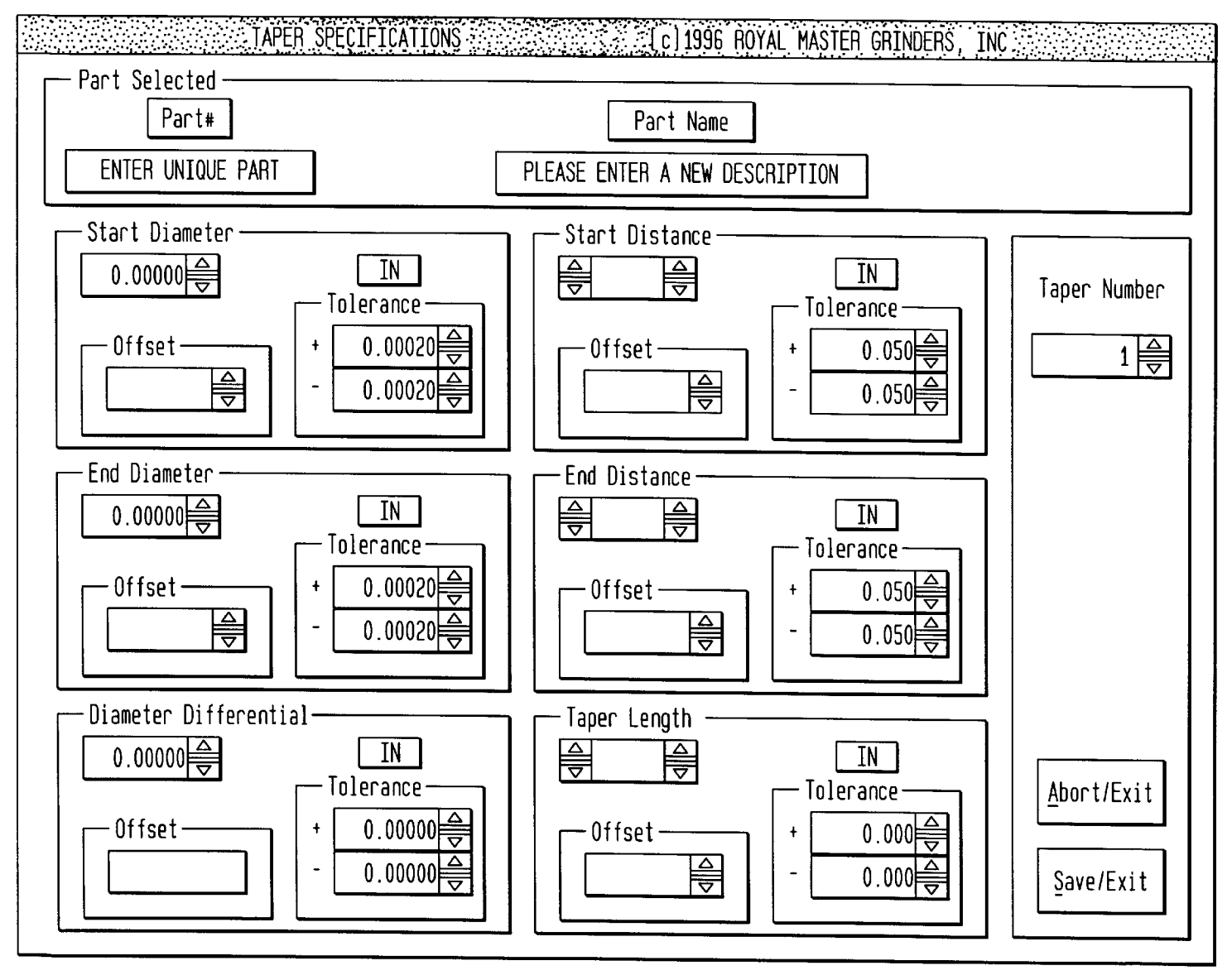
Figure 10:
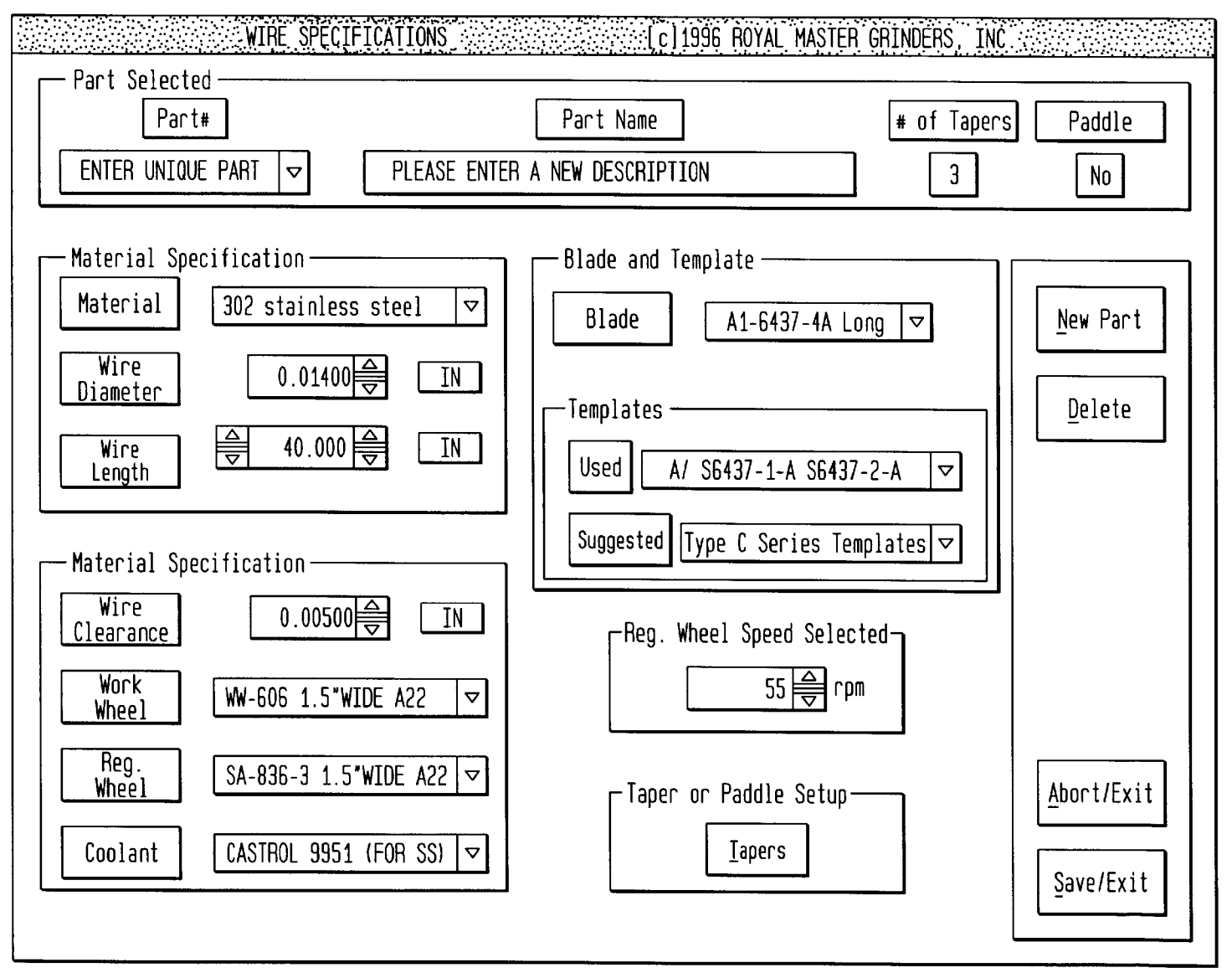

In accordance with a preferred method of operating the present gauging system 40, an operator may begin entering data through the user friendly interface program by inputting the desired information in the wire specifications screen and the taper specifications screen as shown in FIGS. 9 and 10. Once all of the desired wire and taper information is inputted, the operator may return to the main screen and click on a prompt to send the carriage 56 to the starting position. This prompt may be a "home" carriage prompt which activates the stepper motor 64 to slide the carriage to its "home" position so that a workpiece having the desired length can be accommodated.

The operator should place the machined workpiece 28 into the stationary v-shaped wire guide track 52. The workpiece 28 should then be fixed relative to the carriage 56 via clamp 54 at an end portion of the largest diameter section 38 of the workpiece 28.

At this time, in order to activate the gauging system 40 to perform gauging operations, the operator need only click on the "gauge" prompt. The workpiece 28 is then advanced by controlled movement of the carriage 56 through the channel of the gauging device 44 until a desired length of the workpiece 28 extends out of the small exit passageway 48. The gauging device 44 does not take any dimension readings as the workpiece 28 is advanced in a forward direction (i.e., from the entrance funnel 46 toward the exit passageway 48). After the workpiece 28 has been advanced to its forward starting position, it is then pulled backward (i.e., from the exit passageway 48 toward the entrance funnel 46) through the laser gauge 44 where the laser gauging device 44 repeatedly detects the diameter of the workpiece 28 at a sampling speed set by hardware within the control box 74. The sampling speed may be, for example, about 50 milliseconds. Of course, the sampling speed may vary greatly within the scope of the present invention.

Simultaneous with the continuous taking of the diametrical dimension data by the gauging device 44, the position data of the workpiece 28 is also repeatedly detected by the combination of the sensor head 60 and the magnetically encoded information strip 62. To this end, the magnetically encoded information strip 62 includes a predetermined quantity of "ticks" per inch. For example, the magnetically encoded information strip may include 6,000 ticks per inch. The computer system of the gauging system 40 coordinates the position data with the diametrical dimension data and stores the corresponding and continuously sampled data information in computer memory. As the workpiece is continuously drawn backwards through the entrance funnel 46 of the gauging device 44, the gauging device 44 continues to detect the diameter while the cooperation between the sensor head 60 and the magnetically encoded strip 62 continues to take position data points corresponding to the detected diameter data.

The carriage 56 completes its programmed travel at some point after the forward most tip of the workpiece 28 is pulled through the laser sensor of the gauging device 44. Once this occurs, the gauging device 44 provides "zero"readings. Thus, the computer calculates a zero length index at zero diameter and adjusts the length data to the forward most tip of the workpiece 28. Accordingly, the forward most tip of the workpiece 28 may be considered the zero reference point even though such zero reference point is not obtained until after the workpiece 28 has been pulled out of the sensing field of the gauging device 44.

In determining the velocity at which the workpiece 28 will be drawn through the gauging device 44, the operator may opt to enter a constant velocity (typically in inches per second) or may opt to vary the velocity at different regions of the workpiece. It follows that when the workpiece is drawn through the gauging device 44 at a slower velocity, a greater number of sampling points will be determined.

Figure 11:
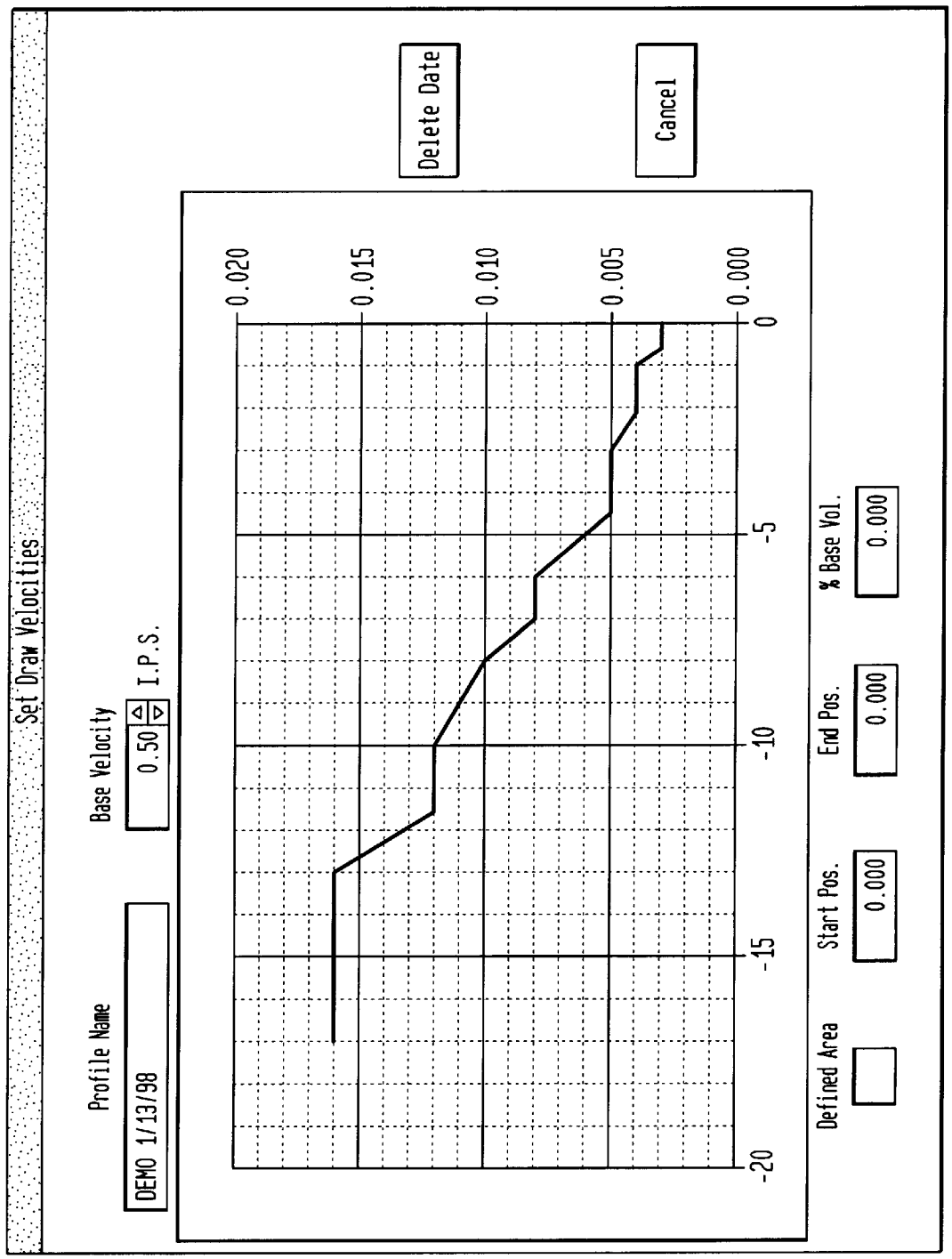
FIG. 11 is a set draw velocity screen shown in a WINDOWS format of the present system.
Figure 12:
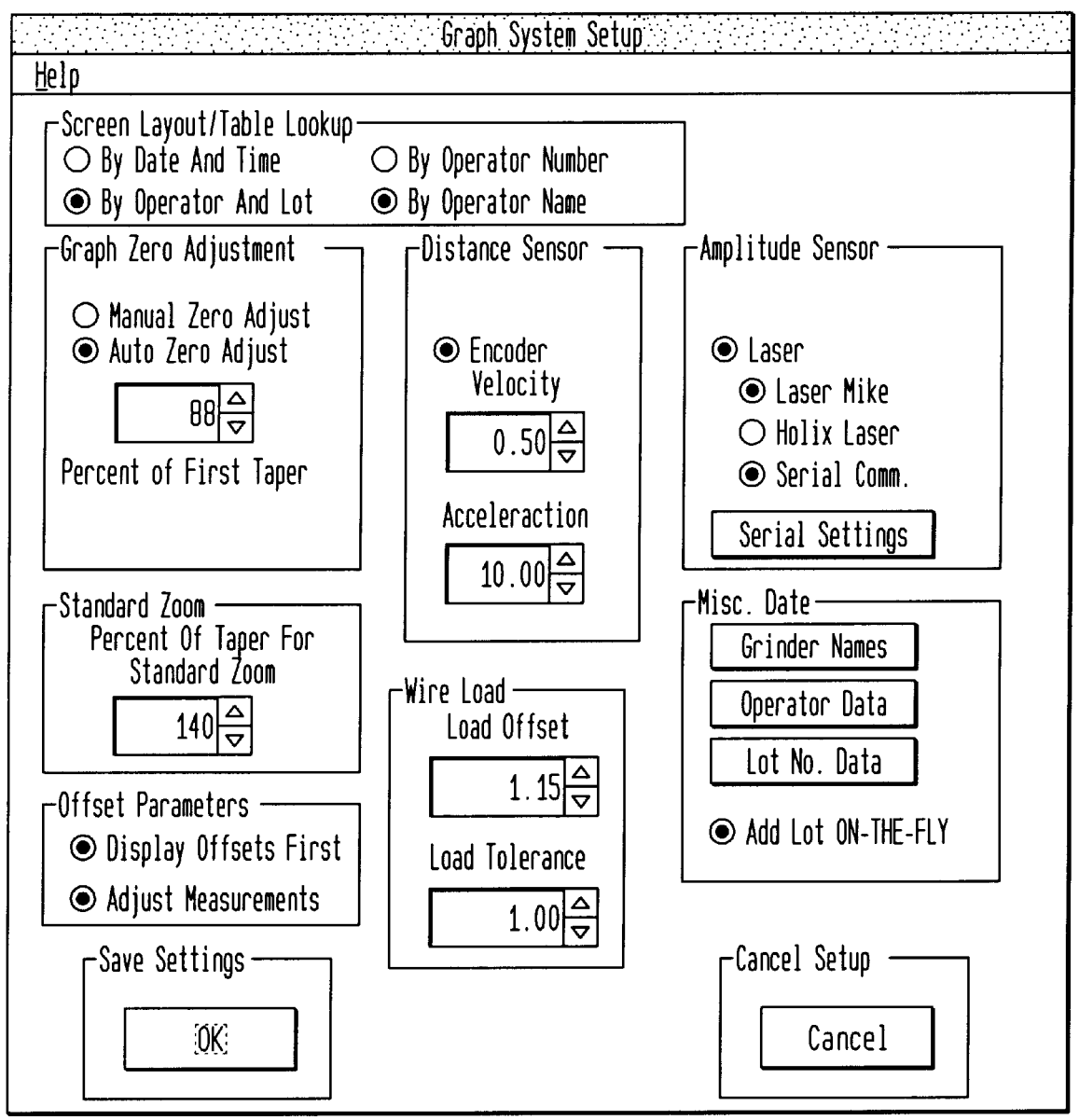
FIG. 12 is a graph system set-up screen shown in a WINDOWS format of the present system.
Figure 13:
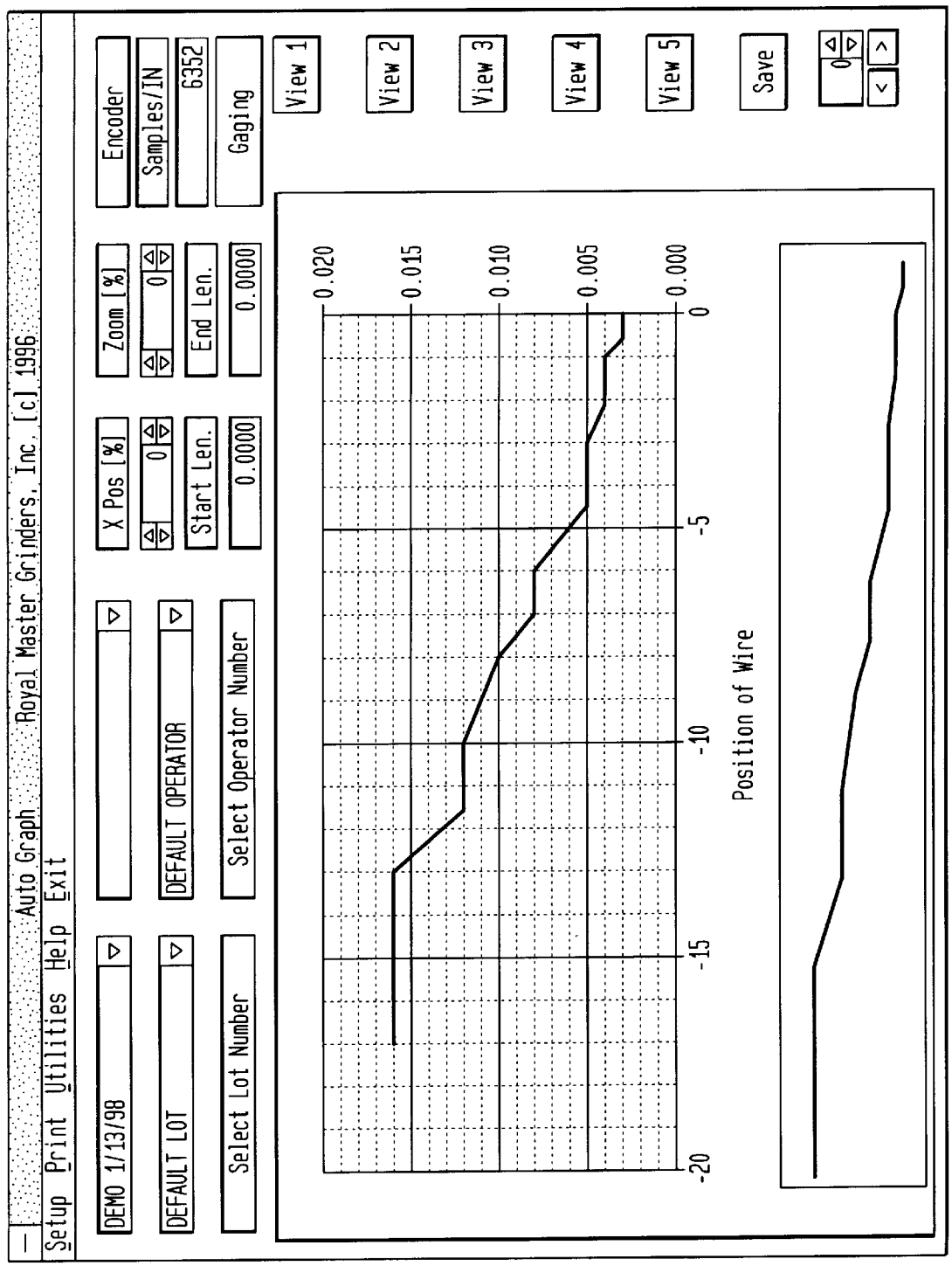
FIG. 13 is an auto graph screen shown in a WINDOWS format of the present system which provides an example of a graphical depiction of a machined workpiece profile.

A "Set Draw Velocity" screen is shown in FIG. 11. By repeatedly detecting and coordinating the diameter of the workpiece with the position of the workpiece, the gauging system 40 may be used to determine a very accurate profile of the workpiece 28 including the smallest constant diameter section 30, the first tapered section 32, the central constant diameter section 34, the second tapered section 36 and the largest constant diameter section 38. This profile may be displayed in graphical form as diameter versus length in an x versus y format. In order to visually compare the profile of the machined workpiece with the profile of an ideal workpiece, the gauging system 40 includes a program for displaying the upper and lower ideal diameter limits for each length position along the ideal (i.e., nominal) workpiece. FIGS. 12 and 13 illustrate a "Graph System Set-up" screen and an "Auto Graph Set-up" screen.

FIG. 14 illustrates a summary of calculated intersection data for a workpiece having seven different tapered regions. This summary illustrates that precise start and end data of the workpiece can be determined at very precise positions along the entire length of a workpiece. FIG. 15 illustrates an "Auto Graph" screen where ideal profile data and actual measured profile data are superimposed.

The operator has the option of printing out various detailed profile graphs where the ideal workpiece profile including a set tolerance is superimposed with the profile of an actual machined workpiece so that a visual indication of an out of tolerance condition can be easily detected. For example, FIG. 16 illustrates a print-out of the graphical profile of top and bottom tolerances 78 and 80 of ideal profile data superimposed with a graph 82 of an actual machined workpiece profile. As evident from this superimposed print-out, it is clear that the actual workpiece data is well within tolerances at the left most constant diameter section while the actual workpiece was machined out of tolerance at the second constant diameter region (from the left side).

An additional advantageous feature of the present invention relates to the ability to superimpose a display of ideal and actual workpiece profiles in different colors. For example, the ideal top and bottom profile 78 and 80 of FIG. 16 may be shown as a red graph while the actual machined profile 82 may be displayed in green.

As a further aid to an operator of the gauging system 40, arrow indicators, such as those shown in FIG. 16, may be used as graphical interpretations of the beginning and end of tapers. If desired, a numerical summary chart, such as the chart of FIG. 14 can be generated showing the particular taper dimensions of selected position along the length of a machined workpiece.

While the foregoing description and figures are directed toward preferred embodiments of the present invention, it should that be appreciated that numerous modifications can be made to various features of the present gauging system while remaining within the scope and spirit of the present invention. Indeed, such modifications are encouraged to be made to the present gauging system. Accordingly, the aforementioned detailed description of the present invention should be taken by way of illustration rather than by way of limitation as the present invention is defined by the claims set forth below.

We claim:

1. A gauging system comprising:

a gauging device adapted to determine the diametrical dimensions of the elongate workpiece;

movement means for effecting relative longitudinal movement between said gauging device and said elongate workpiece such that said gauging device repeatedly detects the diameter of the elongate workpiece relative to reference positions along the length of the workpiece;

position determination means for repeatedly detecting the relative position of the elongate workpiece with respect to detected diametrical dimensions of the workpiece over substantially the entire length thereof; and a computer for coordinating substantially simultaneous detection of workpiece diameter and position by said gauging device and said position determination means, said computer registering a zero reference location of said workpiece and compiling workpiece profile data based on said substantially simultaneous detection of said workpiece diameter and position with respect to said zero reference location.

2. The gauging system of claim 1 wherein said gauging device comprises a non-contact gauging device.

3. The gauging system of claim 2 wherein said gauging device comprises a laser gauging device.

4. The gauging system of claim 1 further comprising a track on which said movement means is slidably mounted.

5. The gauging system of claim 4 wherein said movement means comprises a carriage mounted for controlled slidable movement along said track, and a motor assembly for effecting said controlled slidable movement of said carriage.

6. The gauging system of claim 5 further comprising a clamping mechanism for clamping the elongate workpiece in a fixed position with respect to said carriage.

7. The gauging system of claim 5 further comprising position determination means for repeatedly detecting the relative position of the elongate workpiece with respect to detected diametrical dimensions of the workpiece over substantially the entire length thereof.

8. The gauging system of claim 7 further comprising a computer for coordinating substantially simultaneous detection of workpiece diameter and position by said gauging device and said position determination means, said computer registering a zero reference location of said workpiece and compiling workpiece profile data based on said substantially simultaneous detection of said workpiece diameter and position with respect to said zero reference location.

9. The gauging system of claim 1 wherein said position determination means comprises an encoded information strip arranged substantially parallel to said track, and a sensor head arranged on said carriage, said sensor head being adapted to read position data stored on said encoded information strip as said carriage slides along said track so that substantially continuous calculations of the relative workpiece position can be performed.

10. The gauging system of claim 9 wherein said encoded information strip comprises magnetically encoded position information, and said sensor head is adapted to read said magnetically encoded information.

11. A gauging system comprising:
   a gauging device adapted to determine the diametrical dimensions of an elongate workpiece;
   a movement assembly for effecting relative longitudinal movement between said gauging device and said elongate workpiece such that said gauging device repeatedly detects the diameter of the elongate workpiece relative to reference positions along the length of the workpiece;
   position determination means for repeatedly detecting the relative position of the elongate workpiece with respect to detected diametrical dimensions of the workpiece over substantially the entire length thereof; and
   a computer for coordinating substantially simultaneous detection of workpiece diameter and position by said gauging device and said position determination means, said computer registering a zero reference location of said workpiece and compiling workpiece profile data based on said substantially simultaneous detection of said workpiece diameter and position with respect to said zero reference location.

12. The gauging system of claim 11 wherein said gauging device comprises a non-contact gauging device.

13. The gauging system of claim 12 wherein said gauging device comprises a laser gauging device.

14. The gauging system of claim 11 further comprising a track on which said movement assembly is slidably mounted.

15. The gauging system of claim 14 wherein said movement assembly comprises a carriage mounted for controlled slidable movement along said track, and a motor assembly for effecting said controlled slidable movement of said carriage.

16. The gauging system of claim 15 further comprising a clamping mechanism for clamping the elongate workpiece in a fixed position with respect to said carriage.

17. The gauging system of claim 15 further comprising position determination means for repeatedly detecting the relative position of the elongate workpiece with respect to detected diametrical dimensions of the workpiece over substantially the entire length thereof.

18. The gauging system of claim 17 further comprising a computer for coordinating substantially simultaneous detection of workpiece diameter and position by said gauging device and said position determination means, said computer registering a zero reference location of said workpiece and compiling workpiece profile data based on said substantially simultaneous detection of said workpiece diameter and position with respect to said zero reference location.

19. The gauging system of claim 11 wherein said position determination means comprises an encoded information strip arranged substantially parallel to said track, and a sensor head arranged on said carriage, said sensor head being adapted to read position data stored on said encoded information strip as said carriage slides along said track so that substantially continuous calculations of the workpiece position can be performed.

20. The gauging system of claim 11 wherein said encoded information strip comprises magnetically encoded position information, and said sensor head is adapted to read said magnetically encoded information.

21. The gauging system of claim 11 wherein the elongate workpiece has a profile including a non-uniform diameter along the length thereof, said computer coordinating readings from said gauging device and said movement assembly and thus determining the profile of the elongate workpiece.

22. A gauging system comprising:
   a gauging device adapted to determine the diametrical dimensions of an elongate workpiece;
   a movement assembly constructed to effect relative longitudinal movement between said gauging device and said elongate workpiece such that said gauging device repeatedly detects the diameter of the elongate workpiece relative to reference positions along the length of the workpiece;
   a position determination device constructed to repeatedly detect the relative position of the elongate workpiece with respect to detected diametrical dimensions of the workpiece over substantially the entire length thereof; and
   a computer for coordinating substantially simultaneous detection of workpiece diameter and position by said gauging device and said position determination device, said computer registering a zero reference location of said workpiece and compiling workpiece profile data based on said substantially simultaneous detection of said workpiece diameter in position with respect to said zero reference location.

23. The gauging system of claim 22 wherein said computer system comprises a monitor, said detected dimensional and relative position data being displayed on said monitor.

24. The gauging system of claim 23 wherein said monitor also graphically displays ideal profile data so that the detected workpiece data and the ideal profile data are superimposed on said monitor.

25. The gauging system of claim 24 wherein said detected data is displayed on said monitor in a first color and said ideal profile is displayed on said monitor in a second color so that said detected data and said ideal profile data can be visually distinguished.

26. The gauging system of claim 22 wherein said gauging device comprises a non-contact gauging device.

27. The gauging system of claim 26 wherein said gauging device comprises a laser gauging device.

28. The gauging system of claim 22 further comprising a track on which said movement assembly is slidably mounted.

29. The gauging system of claim 28 wherein said movement assembly comprises a carriage mounted for controlled slidable movement along said track, and a motor assembly for effecting said controlled slidable movement of said carriage.

30. The gauging system of claim 22 wherein said position determination device comprises an encoded information strip arranged substantially parallel to said track, and a sensor head arranged on said carriage, said sensor head being adapted to read position data stored on said encoded information strip as said carriage slides along said track so that substantially continuous calculations of the relative workpiece position can be performed.

31. The gauging system of claim 30 wherein said encoded information strip comprises magnetically encoded position information, and said sensor head is adapted to read said magnetically encoded information.

* * * * *

UNITED STATES PATENT AND TRADEMARK OFFICE
CERTIFICATE OF CORRECTION

PATENT NO. : 6,144,892
DATED : November 7, 2000
INVENTOR(S) : Cheetham et al.

It is certified that error appears in the above-identified patent and that said Letters Patent is hereby corrected as shown below:

Column 1,
Line 41, "-126" should read -- '126 --.
Line 45, "-126" should read -- '126 --.
Line 51, "-126" should read -- '126 --.
Column 2,
Line 46, "-106" should read -- '106 --.

Column 5,
Line 58, "-106" should read '106 --.

Column 6,
Line 22, "-106" should read '106 --.

Column 8,
Line 40, "-106" should read -- '106 --.

Signed and Sealed this

Tenth Day of July, 2001

*Attest:*

Nicholas P. Godici

NICHOLAS P. GODICI
*Attesting Officer*    *Acting Director of the United States Patent and Trademark Office*